Oct. 15, 1968 R. K. WILMER 3,406,382

RANDOM ACCESS FILM STRIP STORAGE SYSTEM

Filed Aug. 27, 1964

4 Sheets-Sheet 1

INVENTOR
RICHARD K. WILMER

BY [signature]
ATTORNEY

RANDOM ACCESS FILM STRIP STORAGE SYSTEM

Filed Aug. 27, 1964 4 Sheets-Sheet 3

Oct. 15, 1968 R. K. WILMER 3,406,382

RANDOM ACCESS FILM STRIP STORAGE SYSTEM

Filed Aug. 27, 1964 4 Sheets-Sheet 4

United States Patent Office 3,406,382
Patented Oct. 15, 1968

3,406,382

RANDOM ACCESS FILM STRIP STORAGE SYSTEM

Richard K. Wilmer, Yorktown Heights, N.Y., assignor to International Business Machines Corporation, New York, N.Y., a corporation of New York Filed Aug. 27, 1964, Ser. No. 392,454
16 Claims. (Cl. 340—173)

ABSTRACT OF THE DISCLOSURE

A film strip storage system comprising multiple storage bins each having a plurality of chutes therein, each said chute being adapted to hold a single film strip in a substantially planar configuration. Means are provided for propelling a single strip from a chute under pneumatic pressure applied to the trailing edge of such strip. Constraining means are provided to direct said propelled strip to the surface of a rotating read drum, said drum having means for securely retaining said strip on the surface thereof. Additional means are provided for releasing leading edge of said strip from the drum, whereby said strip is propelled away from said drum into a constraining path and returned to its storage chute in said bin means. According to an additional aspect of the invention, means are provided by which a hydrodynamic air film is formed between the surface of the rapidly moving strip and the constraining path means. This means includes a tapered leading edge on the strip such that a wedge shaped segment of air is trapped between the leading edge of the strip and said constraining member as the strip is propelled forward. The wedge shaped segment of air is forced between the strip and the constraining member and forms a lubricating air cushion between the strip and the constraining member.

The present invention relates to apparatus for storing and accessing a plurality of elongated film storage strips. More particularly, it relates to such apparatus utilizing pneumatic means to transfer such strips from storage to a read-write position and return same to storage.

In present-day computing systems, many types of storage systems or memories are conventionally used for storing information, which memories must be recurrently called upon and used by the computer in solving various scientific or business problems. The most common type of internal memory used within a computer system is, of course, the magnetic core storage type into which information may be read in and read out in extremely short periods of time. Such core memories also have the feature of being completely randomly addressable. In other words, any word location in the memory may be addressed directly. The usual external storage system utilized in present day computers comprises paper tape, magnetic tape, discs, strips and drum storage, the magnetic tape type being the more prevalent in present day computers. However, with a continuous magnetic tape, as is apparent, to access a particular area within a tape may take a considerable amount of time until the tape can be physically unwound and the desired address found. Therefore, the obvious limitation of the serial or magnetic tape memory is the relatively long period of time required to access a desired portion of said tape. Other memories have been developed falling in between the long serial type of memory such as the magnetic tape or paper tape and the magnetic core memory which is completely randomly addressable. These memories include primarily the magnetic disc and magnetic drum. In these latter types of memories the individual drums or discs are not capable of storing nearly so much information as a single tape, however, a plurality of discs or drums are used and mechanical means are provided for selecting a given disc or drum and further, a desired track on the surface of said storage medium.

Most of the these latter two systems are usually termed as being randomly accessible inasmuch as it is possible to address relatively small segments of data within a relatively large memory, i.e., a particular track on a disc or on a drum. However, both of these systems suffer from the difficulty of being quite complicated mechanically and thus, expensive to build for a given quantity of storage since they require very precise head positioning and drive synchronizing systems.

A recent entry in the computer storage field has been the use of film strips or segments on the order of between one and two feet in length and several inches in width containing a plurality of information tracks. This type of storage strip has been used for both optical storage and also magnetic storage and in operation requires the fetching of a desired strip from a given location in a storage bin, transporting said strip to a reading location and then subsequently returning same to its original spot. Existing methods of selecting a particular strip have involved, for example, the use of a very large drum wherein the strips were stored in a direction parallel with the axis thereof and accessed out of the flat face of said drum, said face being subsantially perpendicular to the axis thereof. The actual fetching mechanisms comprise rotating and translating the drum to reach a particular area and physically picking up a film strip by means of a mechanical picker and carrying same to a reading location, transferring the strip to a reading mechanism and subsequently returning the strip to the drum. These prior art systems for accessing and storing such film strips have been both expensive and also extremely slow due to the necessity of actually moving mechanical parts over considerable distances.

It has now been found that a very satisfactory and high speed film strip handling mechanism may be constructed utilizing pneumatic means for selecting a desired record strip from a suitable multi-position storage bin, transporting same to a reading location and returning same again to said storage location. It has further been found that by shaping the leading edge of the film strip that a highly lubricating hydrodynamic film is formed between the record film and a guide member which both guides and causes lubrication of the film during the traverse thereof throughout the transport operations.

It should be clearly understood that in previous descriptions and in all descriptions which follow, the use of the term "film" is not intended to limit the invention to a photographic or optical process but that such film is intended to refer to any sort of a thin flexible record strip, such as a piece of magnetic tape or film, upon which information may be suitably stored.

It is accordingly a primary object of the present invention to provide a high speed pneumatic storage and accessing system for a plurality of film strips.

It is another object of the invention to provide such a system wherein the film strip is caused to form its own lubricating hydrodynamic film.

It is yet another object of the invention to provide such a system wherein the film is accessed, maintained in its read position on a suitable drum and stored purely by pneumatic means.

It is a further object of the invention to provide such a system wherein means are provided for accurately braking said film when it is returned to its storage location.

Other objects, features and advantages of the invention will be apparent from the following more particular description of a preferred embodiment of the invention, as illustrated in the accompanying drawings.

Figure 1:
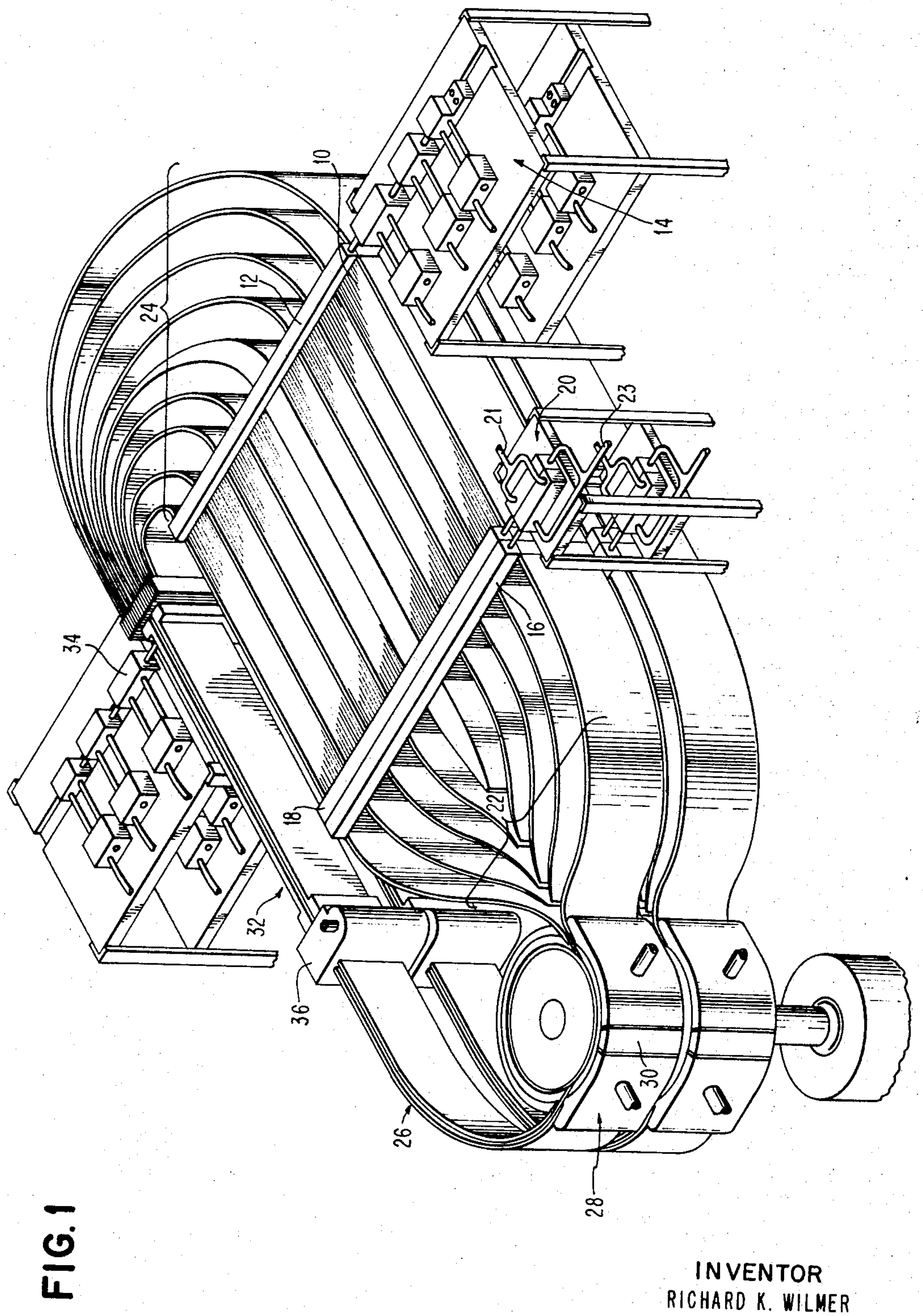
FIGURE 1 is a perspective view of a random access storage system constructed in accordance with the present invention showing a plurality of individual storage bins.

The objects of the present invention are accomplished in general by a film strip storage system comprising a multiple storage location bin having a plurality of chutes therein, each said chute being adapted to hold a single film strip in a substantially planar configuration. Means are provided for propelling a single strip from a chute under pneumatic pressure applied to the trailing edge of said strip. Constraining means are provided to direct said propelled strip to the surface of a rotating read drum, said drum having means for securely retaining said strip on the surface thereof. Additional means are provided for releasing the leading edge of said strip from the drum, whereby said strip is propelled away from said drum into a second constraining path and return to its storage chute in said bin means.

By means of the present system, rapid access may be made to any of a very large number of film strips containing information suitably recorded thereon. The flexibility of this system allows the completely random accessing of any individual strip stored in said system and further, allows the return of the strip to the original storage chute position or even to a different storage chute position if this be desired.

An important feature of this system is the means by which a hydrodynamic air film is successfully formed between the surface of the rapidly moving strip and the constraining path means which diverts the strip into desired locations within the system. This means includes tapering the leading edge of the strip such that a wedge shaped segment of air is entrapped between the leading edge of the strip and said constraining member. As said strip is propelled forward, a centrifugal force is developed against the constraining member which is curved to exert said force on the bottom surface of said strip. It is this forward motion of the tapered strip and resulting centrifugal force which forms the lubricating air cushion between the strip and the constraining member. It should be noted that the air pressure force balances the centrifugal force, thereby maintaining control of the film during the transport. The existence of the lubricating air cushion allows the successful high speed operation of the system as otherwise the film strips could not be rapidly moved from, for example, the storage location to the read-write drum and back again to the storage location. The air film also prevents wear of the film strip which is especially important with strips having magnetic coatings thereon. This pneumatic strip handling allows a much more rapid handling of the film strips and further, provides a far more economical apparatus than would be necessary if the strips had to be grasped mechanically and moved to a storage location, picked up mechanically and subsequently returned to their storage location all by conventional mechanical means for physically engaging said strips. It will be noted as the description of the present invention proceeds, that virtually all operations of the illustrated embodiment of the system are accomplished by pneumatic means.

Referring now more specifically to the drawings, the invention will be particularly pointed out and described. FIGURE 1 is a perspective view of a random access magnetic strip storage system constructed in accordance with a preferred embodiment of the present invention. It will be noted that in the apparatus of FIGURE 1, two separate strip storage systems are shown. It should be noted that in a practical embodiment of the invention there may be 10 or 20 of such individual storage systems ganged together as illustrated in FIGURE 1. Referring now only to the upper section, the system comprises the following major components. The first is the actual storage bin area, which in the present embodiment is disclosed as having 8 individual storage bins 10. As will be pointed out subsequently, each of these individual bins has a plurality of individual storage chutes for each separate film strip. Located at the rear portion of each bin are the pneumatic propelling members 12.

As will be described subsequently with reference to the detail drawings, each bin is provided with an individual pneumatic propelling member which is movable to select a particular chute within its respective bin. Means 14 are provided for positioning the propelling members adjacent a particular chute within a bin as will be described more fully subsequently. Braking assembly members 16 and 18 are located at the leading edge of the bin structure 10. These members are movable relative to each other and perform the function of braking or stopping a film strip when it is returned to a chute in a storage bin. Pneumatic means 20 are provided to move these members 16 and 18 relative to each other to perform the braking operation. Constraining members 22, 24 and 26 all perform the same function in that they constrain or guide the film strips into the desired path either to the read-write head or back into the storage bin as the strips are propelled by the pneumatic propelling means. Drum assembly 28 is the read-write station of the system and is provided with a conventional multi-head read-write assembly 30. When a film strip is propelled from one of the storage bins 10, it is received on the rapidly rotating drum assembly 28 and held in fixed relationship thereto by pneumatic means until desired read-write operations are completed. When such operations are completed, the strip is caused to be propelled into the return chute assembly 32 where it is temporarily stopped and the proper bin 10 selected by the pneumatic selection assembly 34. Subsequently, the strip is propelled from the return chute 32 back into the bin by means of a second pneumatic propelling assembly 36 located at the trailing edge of the return chute 32.

A typical cycle of operation of the system shown in FIGURE 1 would be as follows. A particular storage chute containing a desired film strip in one of the bins 10 would be selected by means of the pneumatic binary positioning means 14 which would position one of the pneumatic propelling assemblies 12 adjacent the trailing edge of the strip in the desired chute. Upon the application of air pressure to the selected propelling member 12, the strip is propelled forward at a great speed and contacts one of the constraining members 22 which causes the strip to be diverted to come into contact with the exterior surface of the rotating drum of assembly 28. A pressurized air film formed along the outer surface of the drum, which will be explained later, causes the strip to adhere to the surface of said drum and be wrapped completely therearound as the drum rotates. The velocity of the strip as it comes into the drum approximately matches the surface velocity of the drum. The read-write head 30 writes on or extracts from the strip whatever information is desired and upon command, pressure is released from the drum in an area adjacent to the discharge chute thereof by means to be described subsequently and the leading edge of the strip passes into the discharge chute and is directed by the constraining members 26 into the return chute 32. At this point the film strip comes to rest in the return chute 32 and the binary selection means 34 causes the return chute to register with the proper diverting chute formed by the constraining means 24 so that the strip will be directed into the proper bin. The proper chute within this bin will have already been determined by the binary selection means 14 which previously selected the desired chute from which the desired film strip was to be taken. This situation, of course, applies only where it is desired to return the film strip to its original storage position which would be the case in most instances.

Assuming that the film strip is still in the return chute 32, the next step is that air pressure is supplied to the second pneumatic propelling member 36 which again causes the film strip to be propelled out of the return chute 32 into the proper chute formed by the constraining members 24 and thence back into the chute within the main storage bins 10. Sometime before the film strip enters its chute in the storage bin 10, the pneumatic braking actuator 20 is energized, causing members 16, 18 to move relative to one another thus bringing the sides of the chute together to stop the film strip in its proper registry position in said chute.

It may thus be seen that the present system provides a very simple and straightforward way of handling film strips fully pneumatically wherein little physical contacting or engaging of a portion of the film strip is necessary and wherein the strip itself is handled with the greatest speed. Also, as stated previously, it will be noted that the formation of the dynamic air film between the film strip and the various constraining members is very important in allowing the high speed transport of these tapes. Having thus described the operation of the invention generally, the individual details of operation of the system with reference to the detailed drawings of FIGURES 2–7 will follow.

Figure 3B:
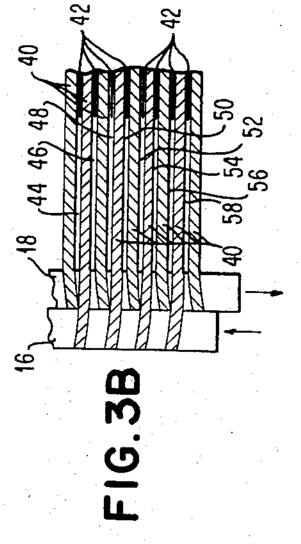
FIGURE 3B is a view identical to FIGURE 3A showing the film strip brake in a first closed position.
Figure 3D:
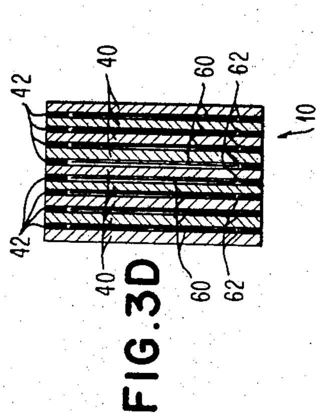
FIGURE 3D is a fragmentary cross-sectional view taken along the section line *d—d* of FIGURE 3A showing the details of the construction of the actual film strip storage bins.
Figure 3A:
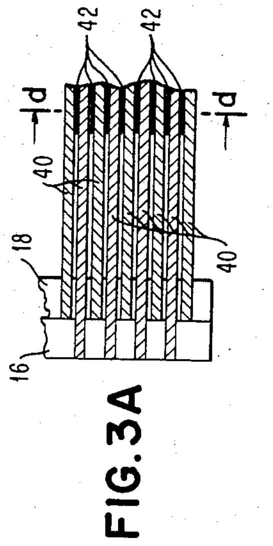
FIGURE 3A is a fragmentary cross-sectional view taken through a portion of the storage bin of FIGURE 1 illustrating the film strip braking mechanism in its normal position.
Figure 3C:
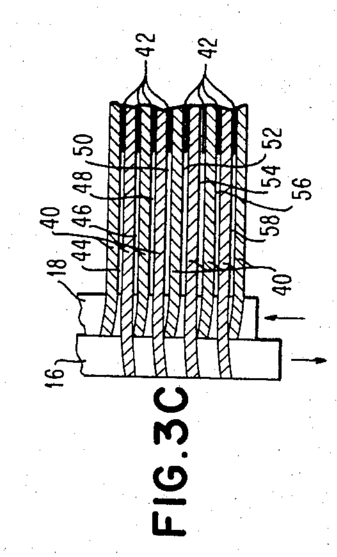
FIGURE 3C is a view identical to FIGURE 3A showing the brake in its alternative closed position.

Referring first to FIGURES 3A–3D, the details of the actual bin and chute are disclosed. FIGURES 3A–3C disclose the details of the braking mechanism and FIGURE 3D is a cross-section through one of the bins 10 showing how a series of chutes might be conveniently fabricated.

Referring to FIGURE 3A, a cross-section through the braking system is shown. In the figure, it will be noted that the chutes are made up of metal shims indicated as members 40 together with the separating strips 42 which serve to space the shims 40 and form the individual film strip storage chutes. The members 16 and 18, as stated previously, move relative to each other as shown in FIGURES 3B and 3C. The structure of the members 16 and 18 is such that they lie at the sides of the shims and engage, for example, ears protruding from the sides of said shims so that the member 18 will move alternate shims and the member 16 those alternate shims interspersed with those moved by the member 18. It will also be noted at this time that the strips 42 terminate at some distance from the movable members 16 and 18 to allow the shims 40 to be moved towards one another and thus pinch off the ends of the chutes.

FIGURE 3B shows the manner in which the ends of alternate slots are closed off by moving members 16 and 18 towards one another. In this figure, the member 16 is moved upwardly and the member 18 downwardly. It will thus be seen that the chutes indicated as members 44, 48, 52 and 56 are closed as the shims adjacent to same are squeezed together. As will be evident, any film strip entering any one of the chutes will be stopped at a position adjacent the point where the spacer strips 42 terminate.

Referring now to FIGURE 3C, the alternate film chutes 46, 50, 54 and 58 are closed as the member 16 is moved downwardly and the member 18 upwardly. It is thus evident that when a selection for a particular chute is made for the return operation, the proper mode of relative motion of the members 16 and 18 must be selected and fed to the means 20. In view of the previous discussion, it will be apparent that any of the even number chutes 0 to 4 or 6 would represent the condition of the shims indicated in FIGURE 3B, wherein the member 16 must move up and the member 18 down. And similarly, if an odd numbered chute such as 1, 3, 5 or 7 were being used, the motion of the members 16 and 18, illustrated in FIGURE 3C, would have to be selected. Suitable circuitry for energizing either the input 21 or 23 to the pneumatic positioning mechanism 20 for members 16 and 18 would be apparent to one skilled in the art. Thus, if the pneumatic binary selection mechanism 14 called for an even numbered chute within one of the bins 10, the pneumatic input 21 would be energized and if the mechanism called for an odd numbered chute, the pneumatic input 23 would be energized.

FIGURE 3D is a cross-section taken along section lines *d—d* of FIGURE 3A and illustrates a typical construction for one of the storage bins 10. The metal shim strips 40 are shown as spaced by the spacer members 42. The thickness of these spacer members is just sufficient to give clearance to the strips 60 shown within the individual chutes 62. This assembly may be fastened together in any convenient manner. It could be fastened by a suitable adhesive, by bolts passing through the shim strips 40 and the spacer strips 42 or by clamping bands which could, for example, pass around the entire assembly of eight bins illustrated in FIGURE 1.

Figure 2:
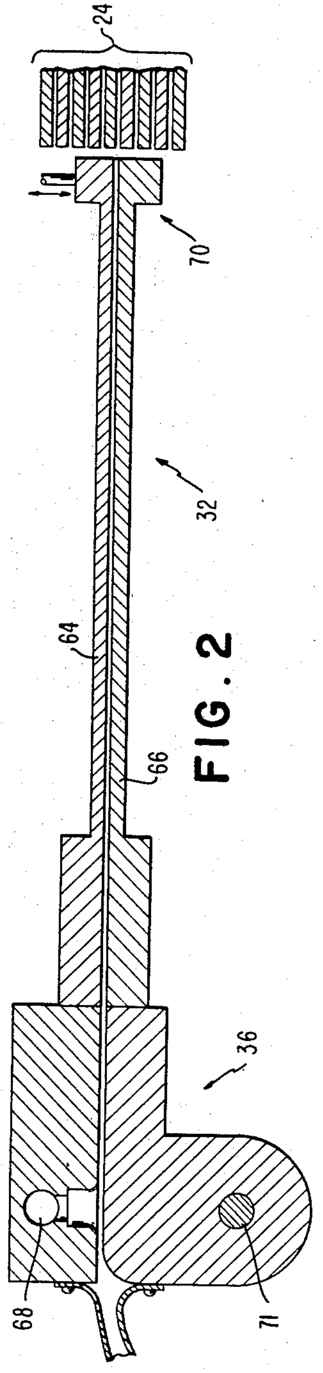
FIGURE 2 is a partial cross-section of the strip return chute of the system of FIGURE 1.

The details of the return chute 32 will now be described with reference to FIGURE 2. In FIGURE 2, it will be noted that the return chute comprises the pneumatic propelling member 36 as well as two plates 64 and 66 which form the upper and lower sides of the return chute. The pneumatic propelling member 36 is constructed very much like the members 12 of FIGURE 1 which will be described with reference to FIGURES 6A–6D, it being noted that an air manifold chamber 68 is provided into which a high pressure air stream is introduced to force the strip out of the return chute 32 to return same into the storage bin 10. It will further be noted that the member 36 is adapted to rotate about pin 71 as the opposite end is moved to register same with one of the diverting chutes formed by the constraining members 24. This opposite end 70 is moved by the pneumatic positioning means 34, which is identical to the means 14 described generally with reference to FIGURE 1. The function of this means 34 is purely to position the end 70 so that the discharge end of the return chute 32 lines up with one of the bin chutes. In the embodiment of the return chute 32, illustrated in FIGURES 1 and 2, the sides of the chute are shown as being open, however, it is apparent that this chute can be fabricated in the same way as the storage chutes shown in FIGURE 3D, that is, with a spacer strip between same to close said sides.

Referring now to FIGURES 6A–6D, the details of the pneumatic accelerating members 12 will be explained.

Figure 6A:
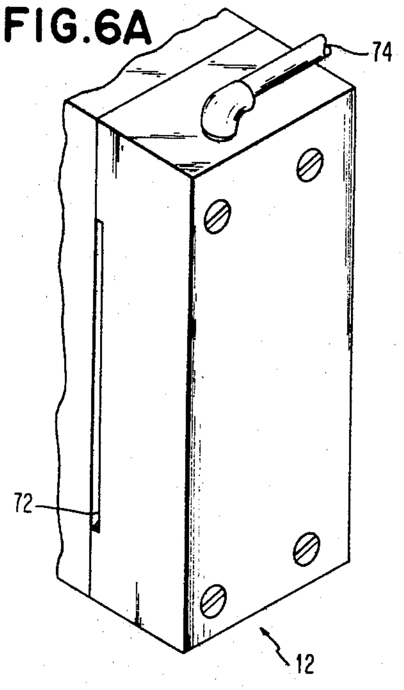
FIGURES 6A–6C are views illustrating the pneumatic accelerating member both for accessing a film strip from the storage bins and also for returning same to the storage bin.

FIGURE 6A is a perspective view of one of the pneumatic accelerating members 12 of FIGURE 1. In this view, the output slot 72, which would face the chutes in the bins 10, is clearly indicated as is the pneumatic input source 74 to which a suitable source of air pressure is supplied upon command to actually propel a film strip from the chute to the read-write drum.

Figure 6B:
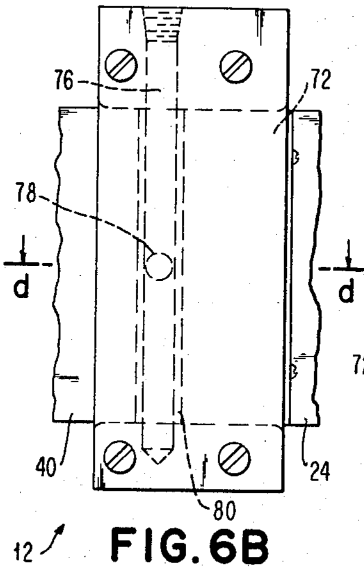
Figure 6C:
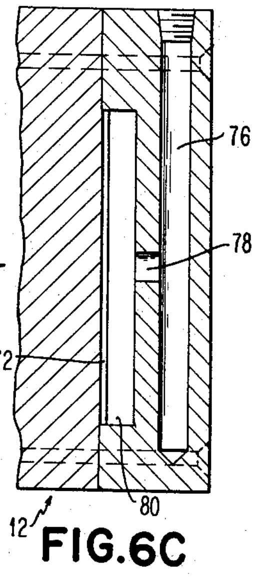
Figure 6D:
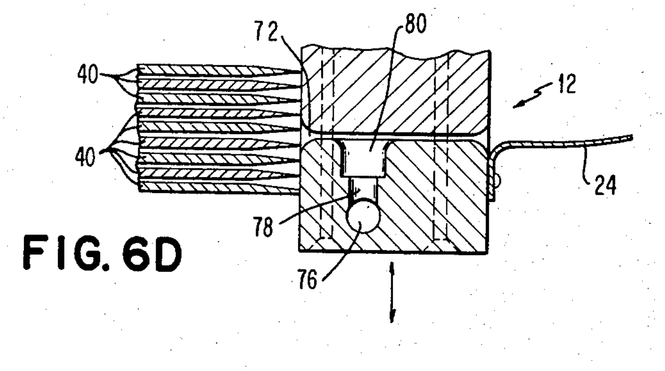
FIGURE 6D is a fragmentary cross-sectional view of the pneumatic accelerating member taken along line *d—d* of FIGURE 6A including a position of the storage bin showing the details of the apparatus which propels the film strip from said storage bin to the read area.

FIGURE 6B is a plan view of the member of FIGURE 6A. FIGURE 6C is a longitudinal cross-sectional view taken through the same member and FIGURE 6D is a lateral cross-sectional view taken along lines *d—d* of FIGURE 6B. In all three of these figures, all the reference numerals apply to the same member and the member can thus be described concurrently looking at all three views of FIGURES 6B through 6D. It will be noted that the member 12 is provided with an intake manifold 76 into which air is introduced from a suitable high pressure air supply. The air then passes through a distributing port 78, into the actual accelerating chamber 80 where it is uniformly distributed within the chute to flow out uniformly through the slot 72, through which it passes into one of the chutes and impinges on the trailing or rear edge of one of the individual film strips. It will be noted in FIGURE 6A, that the top of the next member 12 forms the base plate for the previous member and thus, the last accelerating member would have to have a plate to form the bottom of the accelerating chamber and slot 72.

Referring again to FIGURE 6D, it will be noted that the member 12 is indicated as movable vertically relative to the various shims 40 which form the storaage chutes. The movement of the members 12 by the pneumatic binary positioning means 14, as stated previously, performs the function of aligning a particular slot 72 in one of the propelling members 12 with a desired one of the storage chutes in any one of the bins 10. It will further be noted that each of the members 12 has a separate pneumatic air supply 74 so that at any given fetch command, only a single one of the members 12 woud have an air supply connected thereto, thus only a single strip may be selected at one time for each of the two separate storage assemblies shown in FIGURE 1.

Figure 4A:
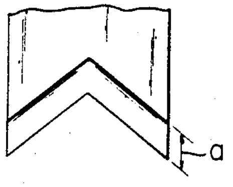
FIGURES 4A–4C are bottom views of the leading edge of typical tape strips suitable for use with the present invention.
Figure 4B:
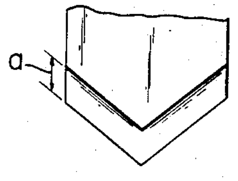
Figure 4C:
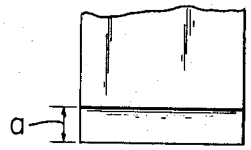

FIGURES 4A–4C and FIGURE 5 illustrate a number of different shapes which the individual film strips may assume and still perform satisfactorily with the present system. FIGURE 4A illustrates an embodiment wherein a notch or inverse V is cut into the leading edge of the tape and the double line indicates the tapered or wedged shaped frontal area which is illustrated more clearly in FIGURE 5. FIGURE 4B illustrates a simple pointed version of the leading edge of the tape again having substantially the same wedge shaped front end. FIGURE 4C illustrates an embodiment wherein the leading edge is merely square with respect to the sides. This embodiment also indicates the existence of the wedge shaped or tapered leading edge of the film strip.

All of the shapes illustrated in FIGURES 4A–4C have been found to work satisfactorily, however, FIGURE 4B has been found to be a preferred embodiment of this system.

Figure 5:
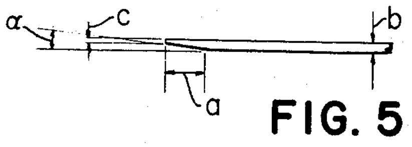
FIGURE 5 is a detailed cross-section of a film strip suitable for use with the present invention illustrating the tapered leading edge of said strip.

Referring now to FIGURE 5, it will be noted that the details of the tapered leading edge of the strip are shown. The dimension *a*, shown in FIGURE 5 and indicated in FIGURES 4A–4C, when selected to be ⅛ of an inch, was found to work satisfactorily with a film strip 0.005 inch thick. This dimension is dimension *b* in FIGURE 5. The tape was tapered so that the dimension *c* was 0.002 inch and satisfactory operation of the storage system resulted. Thus, the taper is 0.003 inch in a distance of ⅛ of an inch. These dimensions result in an included taper angle ($\alpha$) of approximately one degree.

This taper has been found to result in satisfactory operation and is somewhat critical. For example, the dimension *a* may vary plus or minus 1⁄32 of an inch or the taper itself may vary plus or minus 5 percent of the 1° (one degree) ideal with film strips of different thicknesses. Any significant variation from these ideal, wedge limits causes additional drag on the strip during accessing which in turn increases access time and wear damage.

Thus, a variable shape may be utilized for the leading edge of the film strip. However, it must be borne in mind that with all of these shapes a tapered frontal edge is necessary to form the hydrodynamic air film which lubricates the tape relative to the constraining members and renders possible the high speed transport thereof.

Figure 7A:
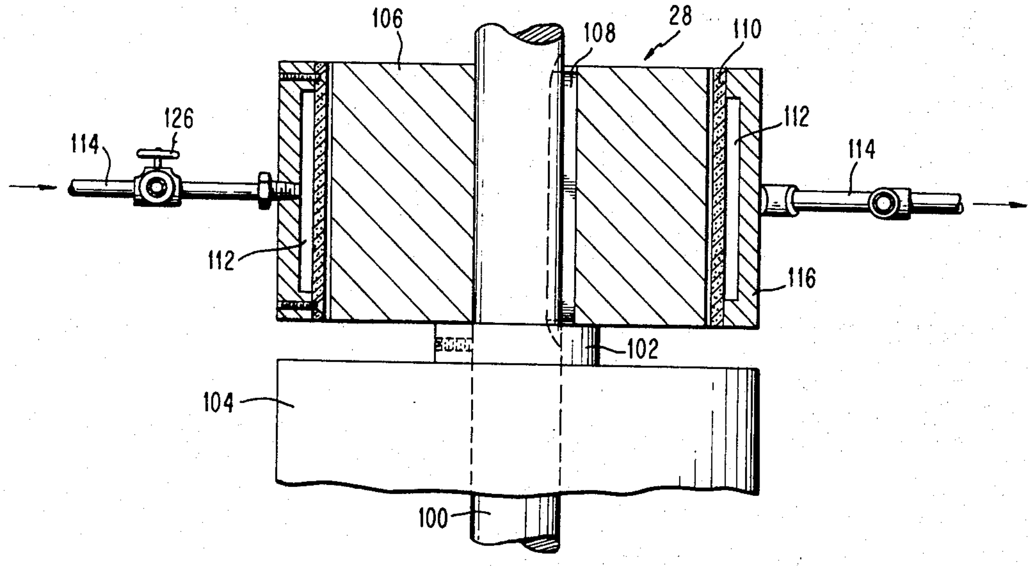
FIGURE 7A is a cross-sectional elevation of the read-write drum taken along the axis of the drive shaft and showing the details thereof.

Finally, the details of the rotating read-write assembly indicated by the numeral 28 in FIGURE 1 will now be described with reference to FIGURES 7A and 7B. As has been explained previously, the function of the drum is to receive a film strip from a storage bin 10 and provide a read-write station at which information may be transcribed from or written onto the film strip mounted thereon. Since the rest of the system is pneumatic in operation, the read-write drum 28 is similarly pneumatic insofar as clamping the film strip on the surface of the drum and subsequently releasing same for return to the storage bins is concerned.

Referring first to the vertical cross-section taken through the drive shaft 100, i.e., FIGURE 7A, the details of operation of this drum and the manner in which the film strip is clamped thereon will be explained.

The drum assembly 28 is turned through the shaft 100 by a motor means (not shown) which would, of course, drive the drum at a synchronous speed. A separating collar 102 is provided to separate the upper drum from the lower assembly indicated by numeral 104 which would, in the embodiment of FIGURE 1, be an additional drum assembly like that shown in the lower portion of that figure. It will be noted that the main drum 106 is affixed to the shaft 100 by suitable means such as the key 108. Thus, the surface of drum 106 is locked to rotate at the shaft speed. The drum is shown as a solid piece of metal but this, of course, is merely for purposes of convenience in the illustration. The drum could be a flanged or webbed member or comprise any other convenient structure provided that a continuous outer cylindrical surface for receiving and supporting the film strip be provided. The system maintains the film strip tightly against the outer surface of the cylinder 106 by means of air pressure applied to the outer surface of said drum and thus, to a film strip mounted thereon through the porous wall 110 which surrounds the drum 106. Pressurized air is supplied to one side of the member 110 through the manifold 112 and the air inlet pipe 114. Since this wall 110 is porous, the air passes more or less uniformly therethrough maintaining a fixed pressurized flow of air against the outer surface of the drum and thus, maintaining a film strip tightly against said surface.

Although a porous material such as some sort of sintered and machined copper, bronze or iron, such as is well known in the art, may be used for the member 110, it is to be understood that a non-porous metal member could be used provided a sufficient number of small holes were drilled uniformly about same to achieve the same result. The member 116 which forms the outer fixed member of the drum assembly 28 contains an air distribution manifold 112 therein. Specific mounting means for the stationary member are not shown in the present drawings as the provision of such means, such as by brackets and the like, would be completely obvious to persons skilled in the art.

Figure 7B:
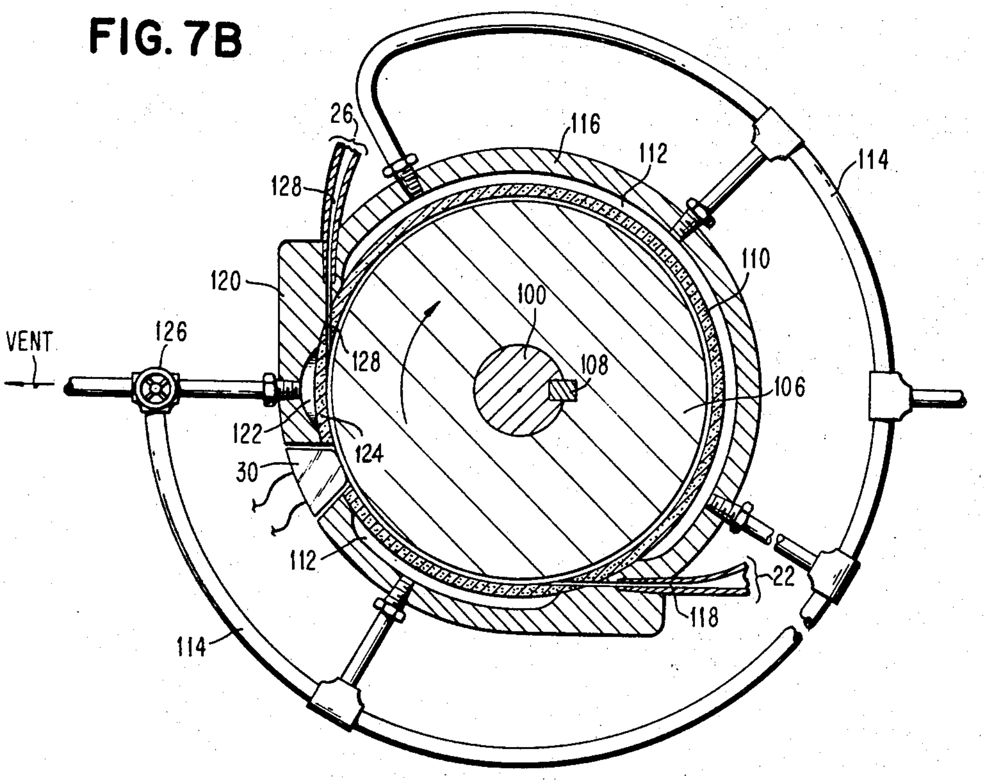
FIGURE 7B is a cross-sectional view of the read-write drum transverse to the axis thereof.

Referring now to FIGURE 7B, the manner in which the read-write head is mounted as well as the means for releasing the film strip from the drum will be more apparent. All of the reference numerals of FIGURE 7A apply equally well to FIGURE 7B. Thus, the shaft 100, the key 108 and the drum 106 make up the rotary portion of the drum assembly 28. The porous wall member 110 and the outer casing 116 make up the primary portion of the outer or stationary structure. In the figure, the input chute 118 formed by the constraining members 22 through which a film strip is introduced to the surface of the drum is clearly visible. The read-write head 30 is also shown located adjacent the surface of the drum. As stated previously, this read-write head would normally be a multiple head structure (where magnetic film strips are used) and as is well known in the art, a great multiplicity of designs for such heads are well known and form no part of this invention other than to say that a multi-head unit would be used if the system were used with a magnetic film strip having plural tracks thereon. If optical or some other recording system were used, an alternative form of read-write head would obviously be utilized. The manifold 112 and outer casing 116 are shown broken up into a plurality of sections. The manner in which this is done is not important so long as a relatively uniform introduction of air pressure through the porous member 110 is provided.

The means by which the film strip is removed from the drum is also clearly shown in FIGURE 7B. It will be noticed that adjacent the read-write head 30 is a portion 120 of the outer casing 116. This casing 120 has a small area or manifold 122 therein which may be alternatively pressurized from the line 114 or simply vented to the atmosphere through the valve 126. An additional porous member 124 is provided adjacent the manifold 122. When the standard pneumatic pressure from line 114 is applied to the manifold 122 through the porous member 124, a uniform air pressure is maintained around the entire periphery of the drum. However, when it is desired to release a film strip from the surface of the drum, the valve 126 is actuated, venting the manifold 122 to the atmosphere and removing the air pressure from this portion of the surface of the drum. Thus, as the drum rotates with a film strip mounted thereon, when the leading edge comes to the portion adjacent the member 124, the natural resiliency of the strip causes it to bend away from the drum surface and to pass out through the slot 128 formed in the outer casing of the assembly between the members 120 and 116. This slot then enters into a chute formed by the constraining members 26 which, as explained previously, will direct the film strip into the return chute 32.

Thus, to briefly summarize the operation of the drum assembly referring primarily to FIGURE 7B, when a film strip is propelled from the storage bins into the storage drum assembly 28, it enters through the chute 118 and because of the air pressure continually supplied through the porous member 110, the film wraps itself tightly around the surface of the drum 106 and continues to adhere thereto until the read or write operations are completed. At such time a signal is supplied which will cause the valve member 126 to release the pressure in manifold 122 and thus, on the next revolution the film strip will pass out through the exit chute 128 in the drum assembly and be propelled by its own inertia into the return chute 32 from which position it will ultimately be returned into the main storage bins 10.

As will be readily apparent, a complete cycle of operations for the present system would be extremely short and, for example, the entire time required for selection of a particular tape storage chute in the bin 10 through the read-write operations on the drum assembly 28, an ultimate return to the storage bin would take on the order of 0.4 second. A similar accessing, reading and restoring operation by previous mechanical means for handling such film strips would be on the order of five to ten times as lengthy as for the instant pneumatic system and also, an extremely large amount of bulky and expensive mechanical handling equipment would be necessitated.

The pneumatic digital positioning assembly indicated by the numerals 14, 34, as stated previously, achieve the particular positioning of the members 12 in FIGURE 1 and 70 in FIGURE 2 in a well known manner. Assuming that the present system has eight storage bins and eight chutes per storage bin, it is necessary to use a four bit binary code to achieve the positioning of these members. Thus, if the chute 0 in bin 0 were being selected, the means 14 would be set to a binary position represented by three 0's (000) as would the means 34. Thus, the 0 chute in the 0 bin would be selected by these two positioning members. In the present discussion, the bin most adjacent the positioning means 34 would be considered the 0 bin. If, for example, bin 6 were desired, the three bit binary code 110 would be supplied. Thus, it may be seen that while only eight bins and eight chutes per bin have been specifically illustrated for reasons of simplification in the present embodiment, it will be apparent that any binary combination of both bins and chutes could equally well be employed.

Such pneumatic binary positioning members are quite well known in the art and are generally referred to as piston adders. Any text book describing pneumatic calculations discusses such piston adders.

There has thus been described a novel pneumatic film strip storage and accessing system capable of processing large numbers of film strips in a very efficient high speed fashion. While the invention has been particularly pointed out and described with reference to a preferred embodiment thereof as represented in the perspective drawing of FIGURE 1 and the detailed drawings of FIGURES 2 through 7, it is to be understood that many modifications of the system disclosed could be made by a person skilled in the art without departing from the spirit and scope of the invention. For example, although pneumatic indexing apparatus for the chute selection in the various bins has been shown, some other means such as mechanical or electrical means could equally well be employed. Similarly, the particular configurations of the read-write head assembly 28 could vary considerably from the structure shown and still handle the film strips in substantially the same manner. These and other modifications would clearly be apparent to a person skilled in the art.

Further, while a serial film strip accessing, reading and return to storage system has been shown and described, it is to be understood that a number of these operations may occur simultaneously, such as removing a strip from storage, removing a strip from the read-write drum and returning a strip to the storage bins from the return chute. While the timing of such high density operations would be critical, they are clearly possible with such a system.

It should also be kept in mind that while the present invention has been indicated to be particularly adaptable for magnetic recording tapes which have been formed into the short film strips described, that other types of film strips have been anticipated and could equally be stored, accessed and read. For example, strips having information recorded thereon readable therefrom by photographic or photo-electric means such as punched tape could be used. Similarly, deformation recording of some sort or conceivably electrostatic recording would also be possible utilizing the general storage and retrieval system taught by the invention.

While the invention has been particularly shown and described with reference to a preferred embodiment thereof, it will be understood by those skilled in the art that various changes in form and details may be made therein without departing from the spirit and scope of the invention.

What is claimed is:

1. A method for forming a hydrodynamic air film between a moving film strip and a constraining member wherein said film strip is to be transported from one point to another along a path determined by said constraining member, said method comprising:

propelling said strip in a forward direction, locating said constraining member in said path such that as the strip is propelled in a forward direction the member exerts a pressure against one surface of said strip, and forming a wedge shaped segment of air between the leading edge of said strip and said constraining member the wider portion of said air segment being at the forward end of said strip, whereby as that strip is propelled forward said wedge shaped segment causes pressurized air to flow between said one surface of said strip and said constraining member.

2. A film strip suitable for high speed transport from one position to another said transport being along a path formed by a constraining member which provides an upward thrust against one surface of said strip during the majority of said transport, said strip comprising:

an elongated flexible sheet member, the forward edge of which is tapered to form a wedge shaped air space between the forward edge of said strip and said constraining member.

3. A film strip as set forth in claim 2 wherein the forward edge of said strip comes to a point, said point defining an angle of between 90–180°.

4. A film strip as set forth in claim 2 wherein the leading edge of said strip is substantially perpendicular to the sides thereof.

5. A film strip as set forth in claim 2 wherein the leading edge of said strip defines an inverted V, said V forming an angle of between 90–180°.

6. A film strip as set forth in claim 2 wherein said taper is between about plus or minus 5 percent of one degree and the length of said taper is ⅛ of an inch plus or minus 1/32 of an inch.

7. A storage and access system for a plurality of thin film strips upon which information is susceptible of being recorded and read therefrom, said system comprising:

a bin having a plurality of separate storage chutes, one for each strip, means for propelling a selected strip from a first end of said bin to a read-write means, and means for pneumatically returning said strip from said read-write means along a separate path from said first path and returning said strip to the opposite end of said storage bin means.

8. A film strip storage and accessing system as set forth in claim 7 wherein means are additionally provided for forming a hydrodynamic air film between said strip as it is transported along said first and second paths to and from said read-write means.

9. A film strip storage and accessing system as set forth in claim 8 wherein all of said storage chutes are substantially planar and parallel to each other.

10. A film strip storage and accessing system as set forth in claim 9 including:

braking means for arresting the motion of a film strip in its chute in a desired position upon return thereof to said chute.

11. A film strip storage and accessing system as set forth in claim 10 wherein the braking means includes:

resilient means comprising the sides of said chutes, and means for urging same together to prevent passage of film strip therethrough.

12. A film strip storage and accessing system as set forth in claim 9 wherein the means for propelling the strip from the storage chute means to the read-write means and for returning the strip to the storage means comprises:

a pressurized air source means to supply air pressure to the trailing edge of said strip within the confines of said chutes.

13. A film strip storage system for storing a plurality of elongated film strips susceptible of having information stored thereon and read therefrom, said system comprising:

storage bin means having storage chute means for each strip therein, means to selectively apply a pneumatic pressure to the trailing edge of a selected strip within each chute to propel said strip from a first end of said chute, read-write means located at a position removed from said storage bin means, means for constraining said strip within a desired path between said storage bin means and said read-write means, means associated with said read-write means for fixedly positioning said strip relative to said read-write means and means for scanning same in a desired fashion, and second constraining path means between said read-write means and said storage chute means and means for pneumatically returning said film strip to the opposite end of said storage chute means.

14. A system as set forth in claim 13 wherein means are included for forming a hydrodynamic lubricating air film between said strip and said constraining means wherein said constraining means is so located and shaped relative to the transport direction of said film strip to cause a centrifugal force to be developed against one side thereof throughout its length, during forward motion of said strip, and taper means on the leading edge of said film strip to form a cushion of air between said leading edge of said strip and said constraining means whereby air is forced between said strip and said constraining means during the transport of said strip and said centrifugal force and the air pressure of said cushion are approximately balanced.

15. A film strip storage system as set forth in claim 14 wherein said positioning means associated with said read-write means comprises:

means for exerting a uniform air pressure against the entire surface of said drum to clamp the strip fixedly thereon, and means for selectively releasing said air pressure from the surface of said drum adjacent a discharge chute in said drum assembly, whereby the leading edge of said strip will enter said discharge chute and the motion of said drum will propel the strip out of said discharge chute.

16. A film strip storage system as set forth in claim 15 including:

a return storage chute in said second constraining path means, said return storage chute being adapted to temporarily receive a film strip from said read-write drum, and means for positioning said return storage chute to divert a film strip into the proper storage bin.

References Cited

UNITED STATES PATENTS

| | | | |
|---|---|---|---|
| 3,107,346 | 10/1963 | Darwin et al. | 340—174.1 |
| 3,267,939 | 8/1966 | Ford et al. | 129—16.1 |
| 3,291,133 | 12/1966 | Glaser et al. | 129—16.1 |
| 3,293,414 | 12/1966 | Barcia | 302—2 X |
| 3,307,555 | 3/1967 | Thies et al. | 340—174.1 X |
| 3,308,451 | 3/1967 | Blackley et al. | 340—174.1 |

BERNARD KONICK, *Examiner.*

J. F. BREIMAYER, *Assistant Examiner.*